US012656309B2

(12) United States Patent
Lee

(10) Patent No.: US 12,656,309 B2
(45) Date of Patent: Jun. 16, 2026

(54) ELECTROPHORESIS GEL CASSETTE

(71) Applicant: SMOBiO Technology, Inc., Hsinchu
City (TW)

(72) Inventor: Kuan-Lin Lee, Hsinchu City (TW)

(73) Assignee: SMOBiO Technology, Inc., Hsinchu
City (TW)

( * ) Notice: Subject to any disclaimer, the term of this
patent is extended or adjusted under 35
U.S.C. 154(b) by 0 days.

(21) Appl. No.: 16/699,146

(22) Filed: Nov. 29, 2019

(65) Prior Publication Data

US 2021/0164936 A1 Jun. 3, 2021

(51) Int. Cl.
G01N 27/447 (2006.01)

(52) U.S. Cl.
CPC . G01N 27/44704 (2013.01); G01N 27/44782
(2013.01)

(58) Field of Classification Search
CPC .................. G01N 27/44704; G01N 27/44782
See application file for complete search history.

(56) References Cited

U.S. PATENT DOCUMENTS

| | | | | |
|---|---|---|---|---|
| 4,919,784 A | * | 4/1990 | Yetman | G01N 27/44704 |
| | | | | 204/612 |
| 5,275,710 A | * | 1/1994 | Gombocz | G01N 27/44782 |
| | | | | 204/464 |
| 5,415,752 A | * | 5/1995 | Boquet | G01N 27/44704 |
| | | | | 425/111 |
| 5,954,934 A | * | 9/1999 | Manusu | G01N 27/44704 |
| | | | | 204/618 |

* cited by examiner

*Primary Examiner* — Shizhi Qian
(74) *Attorney, Agent, or Firm* — Hannah Tien

(57) ABSTRACT

An electrophoresis gel cassette is provided, including a first
plate, a second plate, a plurality of spacers and at least one
first protrusion, wherein the first plate and the second plate
respectively includes a top side, a bottom side, a left side, a
right side, a first surface and a second surface, the second
plate is substantially parallel to the first plate so that the first
surface of the first plate and the first surface of the second
plate are parallel to each other, and the plurality of spacers
are disposed on a left portion and a right portion of the first
surface of the first plate or the second plate, and the first
plate, the second plate, and the plurality of spacers are
assembled together to form a gel accommodating space, and
the at least one first protrusion is disposed at an appropriate
position on a bottom portion of the first surface of the first
plate or the second plate for connecting the first plate and the
second plate so as to maintain the electrophoresis gel
accommodating space.

3 Claims, 7 Drawing Sheets

ELECTROPHORESIS GEL CASSETTE

FIELD OF THE INVENTION

The present invention relates to an electrophoresis gel
cassette, in particular, to an electrophoresis gel cassette with
the ability to prevent from deformation of the electrophoresis gel.

BACKGROUND OF THE INVENTION

Electrophoresis is a commonly used method for identifying and isolating biological macromolecules in the field of
molecular biology. The principle is to utilize the differences
in the speed these molecules will travel within a medium
under the influence of an electric field because of a difference in molecular weight and charge value between different
biomacromolecules. The result of this process is a separation
and isolation of biological macromolecules.

The medium commonly used in electrophoresis to separate biomacromolecules is an electrophoretic gel, which is
generally flat and has regularly-spaced wells to hold the
macromolecules to be tested. In general, electrophoretic gels
are divided into two major types: agarose gels and poly-
acrylamide gels. Agarose gels are relatively easy to manufacture and their main ingredients are derived from poly-
saccharide polymers in seaweed. Although the pore sizes of
agarose gels are less uniform, the separation effect on the
DNA fragment and proteins larger than 200 kDa is better.
Polyacrylamide gels have relatively smaller and more uniform pore sizes compared to agarose gels and are therefore
commonly used to separate proteins. In addition, polyacry-
lamide gels generally have better resolution and are there-
fore more expensive than agarose gels. However, it should
be noted that polyacrylamide gel powder is toxic and should
be used with care.

In the past, most laboratories used their own electropho-
resis gels. However, the benefits of using pre-formed elec-
trophoretic gel were quickly discovered: they saved time and
were easier to produce accurate, consistent results with.

At present, a precast gel cassette comprises a pair of two
flat plates capable of combining convex and concave edges,
and the cover has a space for accommodating the electro-
phoresis gel. However, the precast electrophoresis gel cas-
sette with aforementioned structure may distort during storage. To prevent from losing moisture, electrophoresis gel is
submerged in a buffer solution. Yet, the electrophoresis
matrices will absorb the buffer and may possibly result in
inflation the electrophoresis gels, hence interfering with the
results of electrophoresis. Also, the precast electrophoresis
gel cassette may distort during transportation. If the precast
electrophoresis gel cassette is squeezed by an external force,
all the force is taken up by the two plates composing the
electrophoresis gel cassette, which will cause the gel to be
squeezed and deformed. Therefore, today's the precast electrophoresis gel cassette needs to be further improved to
prevent from deformation of the precast electrophoretic gel.

SUMMARY OF THE INVENTION

The invention provides an electrophoresis gel cassette,
comprising a first plate, a second plate, a plurality of spacers
and at least one first protrusion, wherein the first plate and
the second plate respectively includes a top side, a bottom
side, a left side, a right side, a first surface and a second
surface, the second plate is substantially parallel to the first
plate so that the first surface of the first plate and the first surface of the second plate are parallel to each other, and the
plurality of spacers are disposed on a left portion and a right
portion of the first surface of the first plate or the second
plate, and the first plate, the second plate, and the plurality
of spacers are assembled together to form a gel accommo-
dating space. And the at least one first protrusion is disposed
at an appropriate position on a bottom portion of the first
surface of the first plate or the second plate for connecting
the first plate and the second plate so as to maintain the
electrophoresis gel accommodating space and to prevent
from deformation of the electrophoresis gel.

According to the invention, the electrophoresis gel cas-
sette further comprises at least one second protrusion dis-
posed at an appropriate position on a top portion of the first
surface of the first plate or the second plate.

The invention also provides an electrophoresis gel cas-
sette, comprising a first plate, a second plate, a plurality of
spacers and at least one first protrusion, wherein the first
plate and the second plate respectively includes a top side,
a bottom side, a left side, a right side, a first surface and a
second surface, the second plate is substantially parallel to
the first plate so that the first surface of the first plate and the
first surface of the second plate are parallel to each other, and
the plurality of spacers are disposed on a left portion and a
right portion of the first surface of the first plate or the
second plate, and the first plate, the second plate, and the
plurality of spacers are assembled together to form a gel
accommodating space. And the at least one first protrusion
is disposed at an appropriate position on a top portion of the
first surface of the first plate or the second plate for con-
necting the first plate and the second plate so as to maintain
the electrophoresis gel accommodating space and to prevent
from deformation of the electrophoresis gel.

According to the invention, the electrophoresis gel cas-
sette further comprises at least one second protrusion dis-
posed at an appropriate position on a bottom portion of the
first surface of the first plate or the second plate.

DETAILED DESCRIPTION OF THE INVENTION

Figure 1:
FIG. 1 shows structures of the first plate and the second
plate according to the invention.
Figure 1:

The invention provides an electrophoresis gel cassette,
comprising a first plate, a second plate, a plurality of spacers and at least one first protrusion, wherein the first plate and the second plate respectively includes a top side, a bottom side, a left side, a right side, a first surface and a second surface, the second plate is substantially parallel to the first plate so that the first surface of the first plate and the first surface of the second plate are parallel to each other, and the plurality of spacers are disposed on a left portion and a right portion of the first surface of the first plate or the second plate, and the first plate, the second plate, and the plurality of spacers are assembled together to form a gel accommodating space. And the at least one first protrusion is disposed at an appropriate position on a bottom portion of the first surface of the first plate or the second plate for connecting the first plate and the second plate so as to maintain the electrophoresis gel accommodating space and to prevent from deformation of the electrophoresis gel.

According to the invention, the at least one first protrusion may be a plurality of first protrusions. Preferably, the plurality of first protrusions are equidistantly disposed from each other at an appropriate position on the bottom portion of the first surface of the first plate or the second plate.

According to the invention, the electrophoresis gel cassette further comprises at least one second protrusion being disposed at an appropriate position on a top portion of the first surface of the first plate or the second plate.

The invention also provides an electrophoresis gel cassette, comprising a first plate, a second plate, a plurality of spacers and at least one first protrusion, wherein the first plate and the second plate respectively includes a top side, a bottom side, a left side, a right side, a first surface and a second surface, the second plate is substantially parallel to the first plate so that the first surface of the first plate and the first surface of the second plate are parallel to each other, and the plurality of spacers are disposed on a left portion and a right portion of the first surface of the first plate or the second plate, and the first plate, the second plate, and the plurality of spacers are assembled together to form a gel accommodating space. And the at least one first protrusion is disposed at an appropriate position on a top portion of the first surface of the first plate or the second plate for connecting the first plate and the second plate so as to maintain the electrophoresis gel accommodating space and to prevent from deformation of the electrophoresis gel.

Preferably, the at least one first protrusion is a plurality of first protrusions, and the plurality of first protrusions are equidistantly disposed from each other at an appropriate position on the top portion of the first surface of the first plate or the second plate.

According to the invention, the electrophoresis gel cassette further comprises at least one second protrusion being disposed at an appropriate position on a bottom portion of the first surface of the first plate or the second plate.

To prevent from affecting the analysis of electrophoretic samples, the appropriate position of the said at least one first protrusion or at least one second protrusion is a position at which an electrophoresis sample does not flow through during an electrophoresis processing.

The said term "integrally formed" herein indicates "an object is formed by assembling two parts into one piece" or "an object is formed in one-piece during manufacture".

In one embodiment, the at least one first protrusion is integrally formed with the first plate or the second plate; preferably, the at least one first protrusion and the at least one second protrusion are integrally formed with the first plate or the second plate.

The plurality of spacers according to the invention, in one embodiment, are disposed on a left portion and a right portion of the first surface of the first plate or the second plate. In another embodiment, the plurality of spacers are disposed on a left portion and a right portion of the first surfaces of the first plate and the second plate. Preferably, the plurality of spacers are integrally formed with the first plate or the second plate. Most preferred, the plurality of spacers are integrally formed with the first plate and the second plate.

According to the invention, the corresponding plurality of spacers and the at least one first protrusion or the at least one second protrusion are bonded to the first plate or the second plate by using an adhesive or ultrasonic oscillation.

DESCRIPTION OF EMBODIMENTS

The examples below are non-limiting and are merely representative of various aspects and features of the present invention.

The invention recites an electrophoresis gel cassette. During the storage, the electrophoresis gel usually submerged in a buffer solution. However, the electrophoresis matrices will absorb the buffer and may possibly result in inflation the electrophoresis gels, hence interfering with the results of electrophoresis. Similarly, the precast electrophoresis gel cassette may distort by extruding during transportation. If the precast electrophoresis gel cassette is squeezed by an external force, all the force is taken up by the two plates composing the electrophoresis gel cassette, which will cause the gel to be squeezed and deformed. Therefore, in the prior art plastic shell technology, the present invention designs a protrusion which can maintain the rubber shell structure of the electrophoresis gel to prevent from the electrophoresis gel matrix from being expanded or deformed by absorbing the buffer or being pressed by an external force. Therefore, the invention provides a protrusion on the electrophoresis gel cassette to maintain the structure of the gel accommodating space, so as to prevent from the electrophoresis gel matrix from expanding or deforming due to absorption buffer solution or being squeezed by an external force.

As shown in FIG. 1, the invention provided an electrophoresis gel cassette 1 which comprised two parallelly disposed plate, a first plate 10 and a second plate 20, a plurality of spacers 50 and at least one first protrusion, wherein the first plate 10 comprised a top side 101, a bottom side 102, a right side 103, a left side 104, a first surface 105, and a second surface 106; also, the second plate 20 comprised a top side 201, a bottom side 202, a right side 203, a left side 204, a second surface 205, and a first surface 206; the second plate 20 is substantially parallel to the first plate 10 so that the first surface 105 of the first plate 10 and the first surface 206 of the second plate 20 are parallel to each other, and the plurality of spacers 50 are disposed on a left portion and a right portion of the first surface of the first plate 10 or the second plate 20, wherein the plurality of spacers 50 meant convex edges 501 respectively disposed on a left portion and a right portion of the first surface 105 of the first plate 10 and concave edges 502 respectively disposed on a left portion and a right portion of the first surface 206 of the second plate 20; and the at least one first protrusion was a plurality of bottom protrusions 30 disposed on a bottom portion of the first surface 105 of the first plate 10; or the at least one first protrusion was a plurality of top protrusions 40 disposed on a top portion of the first surface 105 of the first plate 10.

Figure 2:
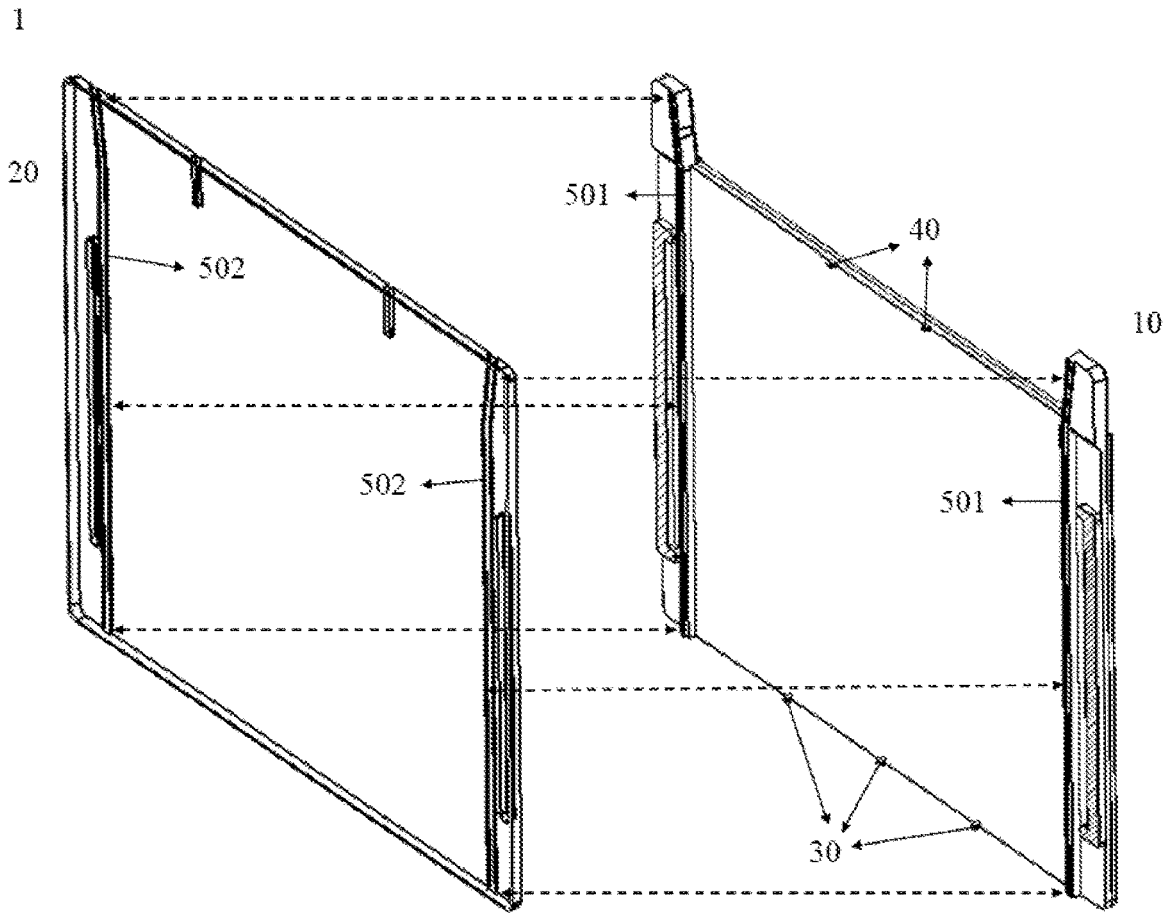
FIG. 2 shows the combination diagram according to the
invention.

When the first surfaces of the first plate 10 and the second plate 20 were assembled in parallel as shown in FIG. 2, the convex edges 501 and the concave edges 502 were connected correspondingly to form an electrophoresis gel accommodating space, and the plurality of bottom protrusions 30 or the plurality of top protrusions 40 were provided to bond the first plate 10 and the second plate 20 together to maintain the electrophoresis gel accommodating space so as to prevent from the deformation of the electrophoresis gel.

Preferably, the invention further comprised at least one second protrusion, as shown in FIG. 1, if the at least one first protrusion was a plurality of bottom protrusions 30, the at least one second protrusion was a plurality of top protrusions 40; if the at least one first protrusion was a plurality of top protrusions 40, the at least one second protrusion was a plurality of bottom protrusions 30.

In an embodiment, the plurality of protrusions were equidistantly disposed from each other; In a preferred embodiment, the plurality of protrusions were integrally formed with the first plate 10 or the second plate 20.

In a further preferred embodiment, the first plate 10 simultaneously comprised a plurality of bottom protrusions 30 and a plurality of top protrusions 40.

According to the invention, the plurality of spacers 50 and the at least one first protrusion or the at least one second protrusion were bonded to the first plate 10 or the second plate 20 by using an adhesive or ultrasonic oscillation.

Figure 3:
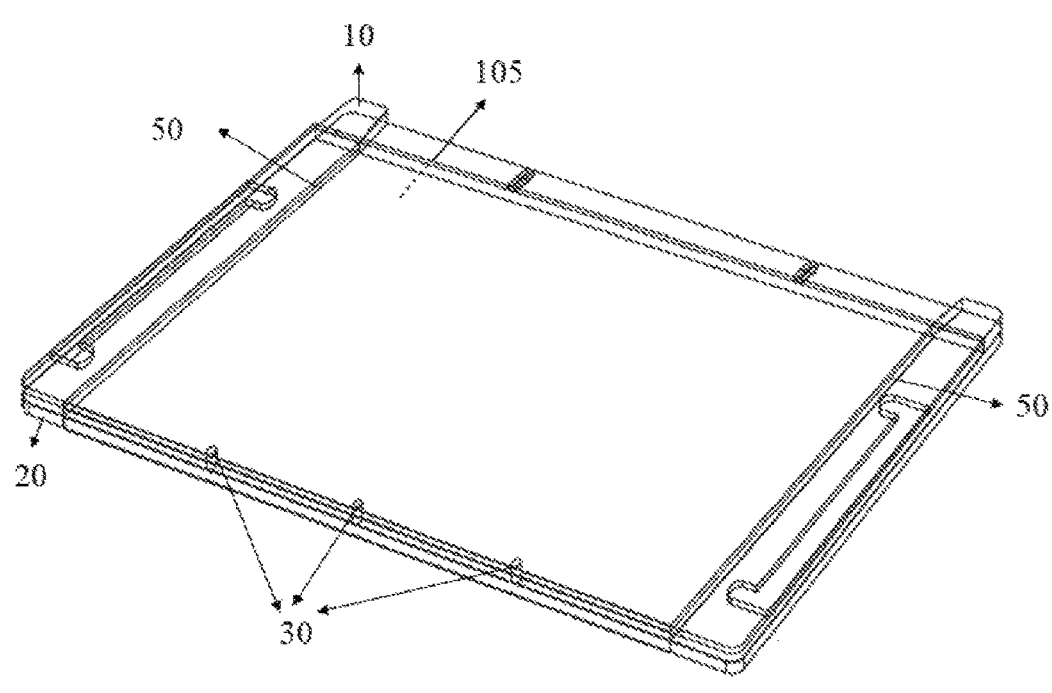
FIG. 3 shows the electrophoresis gel cassette comprises at
least one first protrusion disposed at an appropriate position
on a bottom portion of the first surface of the first plate.
Figure 3:
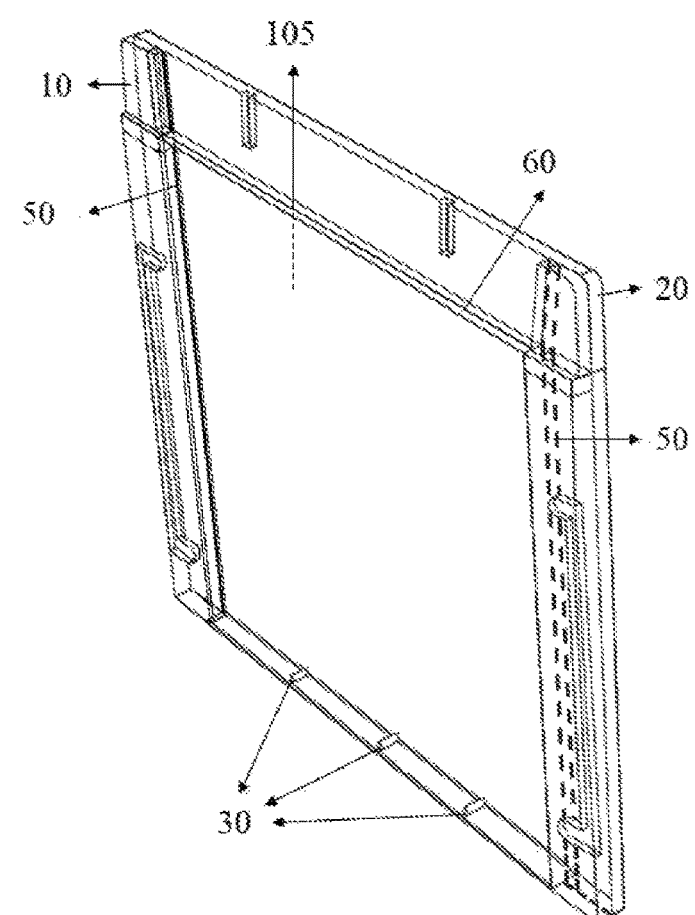

The embodiment of the electrophoresis gel cassette comprised a plurality of bottom protrusions is shown in FIG. 3, in which FIG. 3 indicates that the plurality of bottom protrusions 30 were equidistantly disposed from each other at an appropriate position on a bottom portion of the first surface 105 of the first plate 10 and were bonded with the second plate 20 by using ultrasonic oscillation to form an electrophoresis gel accommodating space 60, and the electrophoresis gel accommodating space 60 was maintained via the plurality of spacers 50 and the plurality of bottom protrusions 30.

Figure 4:
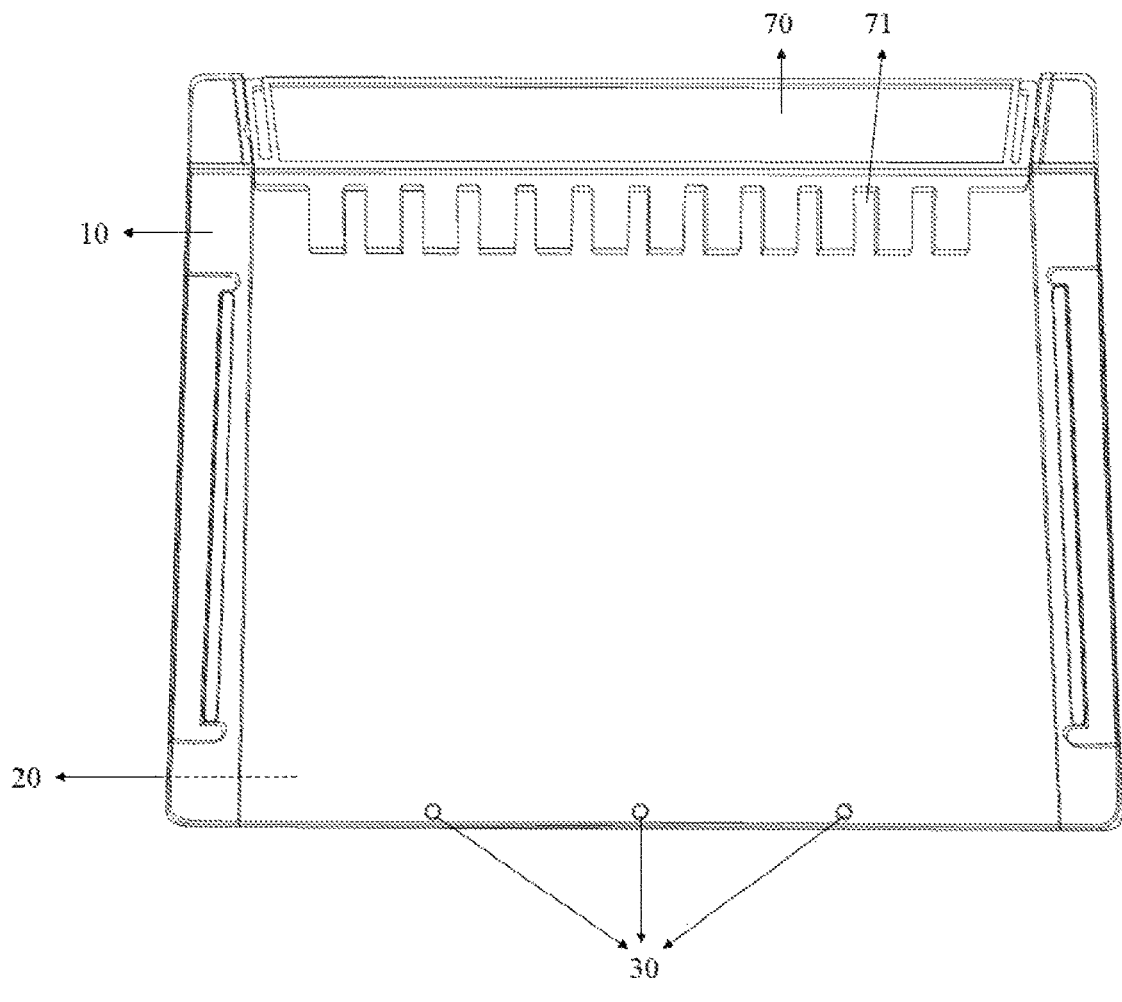
FIG. 4 shows the electrophoresis gel cassette comprises a
comb and at least one first protrusion disposed at an appro-
priate position on a bottom portion of the first surface of the
first plate.

In order to prevented the position of the plurality of bottom protrusions from affecting the analysis of electrophoretic samples, the plurality of bottom protrusions were disposed at the position at which an electrophoresis sample did not flow through during an electrophoresis processing. As shown in FIG. 4, the plurality of bottom protrusions 30 were disposed at the position corresponding to the intervals 71 of the sample loading wells formed by a comb 70 and did not affect the analysis of the electrophoretic samples.

Figure 5:
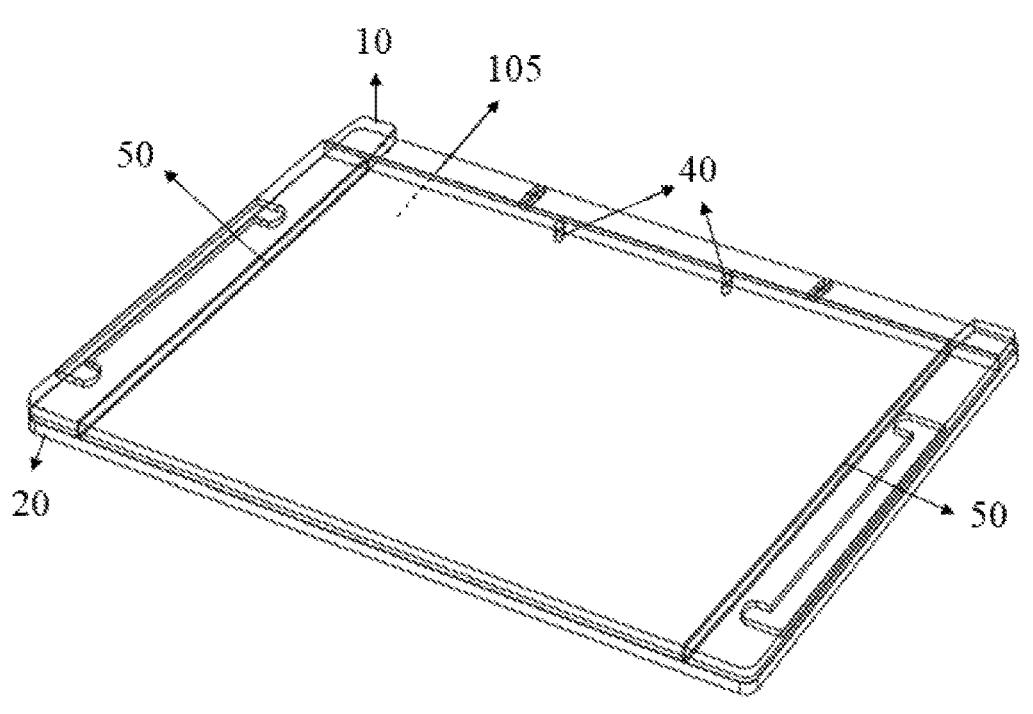
FIG. 5 shows the electrophoresis gel cassette comprises at
least one first protrusion disposed at an appropriate position
on a top portion of the first surface of the first plate.
Figure 5:
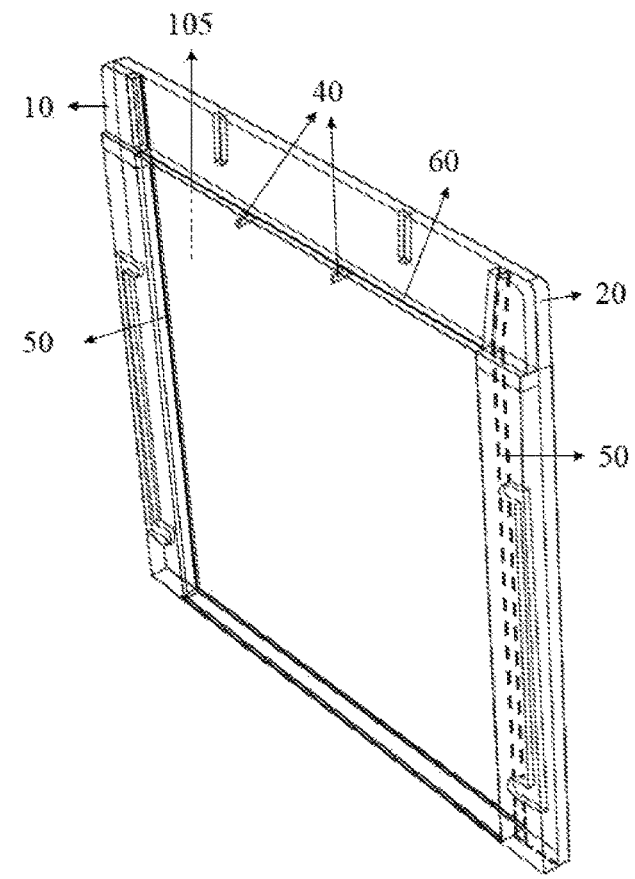

The embodiment of the electrophoresis gel cassette comprised a plurality of top protrusions is shown in FIG. 5, in which FIG. 5 indicates that the plurality of top protrusions 40 were equidistantly disposed from each other at an appropriate position on a top portion of the first surface 105 of the first plate 10 and were bonded with the second plate 20 by using ultrasonic oscillation to form an electrophoresis gel accommodating space 60, and the electrophoresis gel accommodating space 60 was maintained via the plurality of spacers 50 and the plurality of top protrusions 40.

Figure 6:
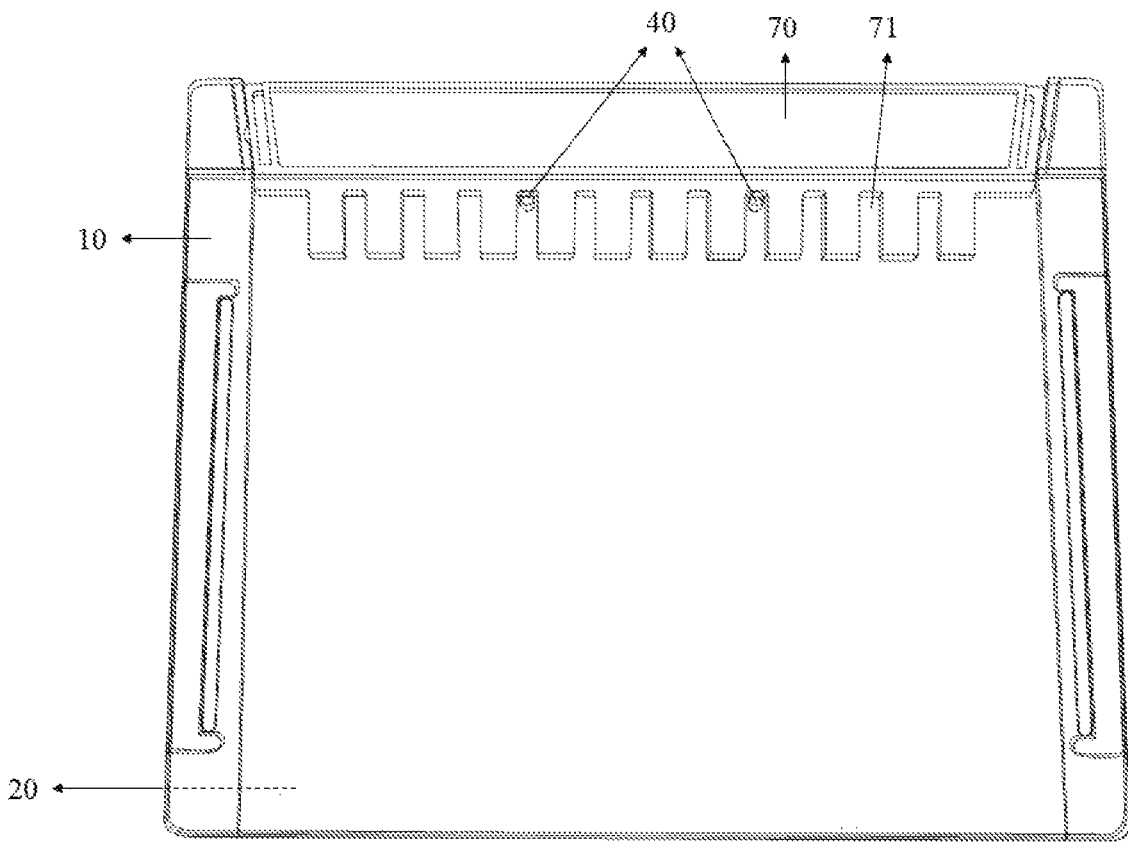
FIG. 6 shows the electrophoresis gel cassette comprises a
comb and at least one first protrusion disposed at an appro-
priate position on a top portion of the first surface of the first
plate.

Similarly, in order to prevented the position of the plurality of top protrusions from affecting the analysis of electrophoretic samples, the plurality of top side protrusions were also disposed at the position at which an electrophoresis sample did not flow through during an electrophoresis processing. As shown in FIG. 6, the plurality of top protrusions 40 were disposed at the position corresponding to the interval 71 of the sample loading wells NO. 4 and No. 5 and the interval 71 of the sample loading wells NO. 8 and No. 9 formed by a comb 70 and did not affect the analysis of the electrophoretic samples.

Figure 7:
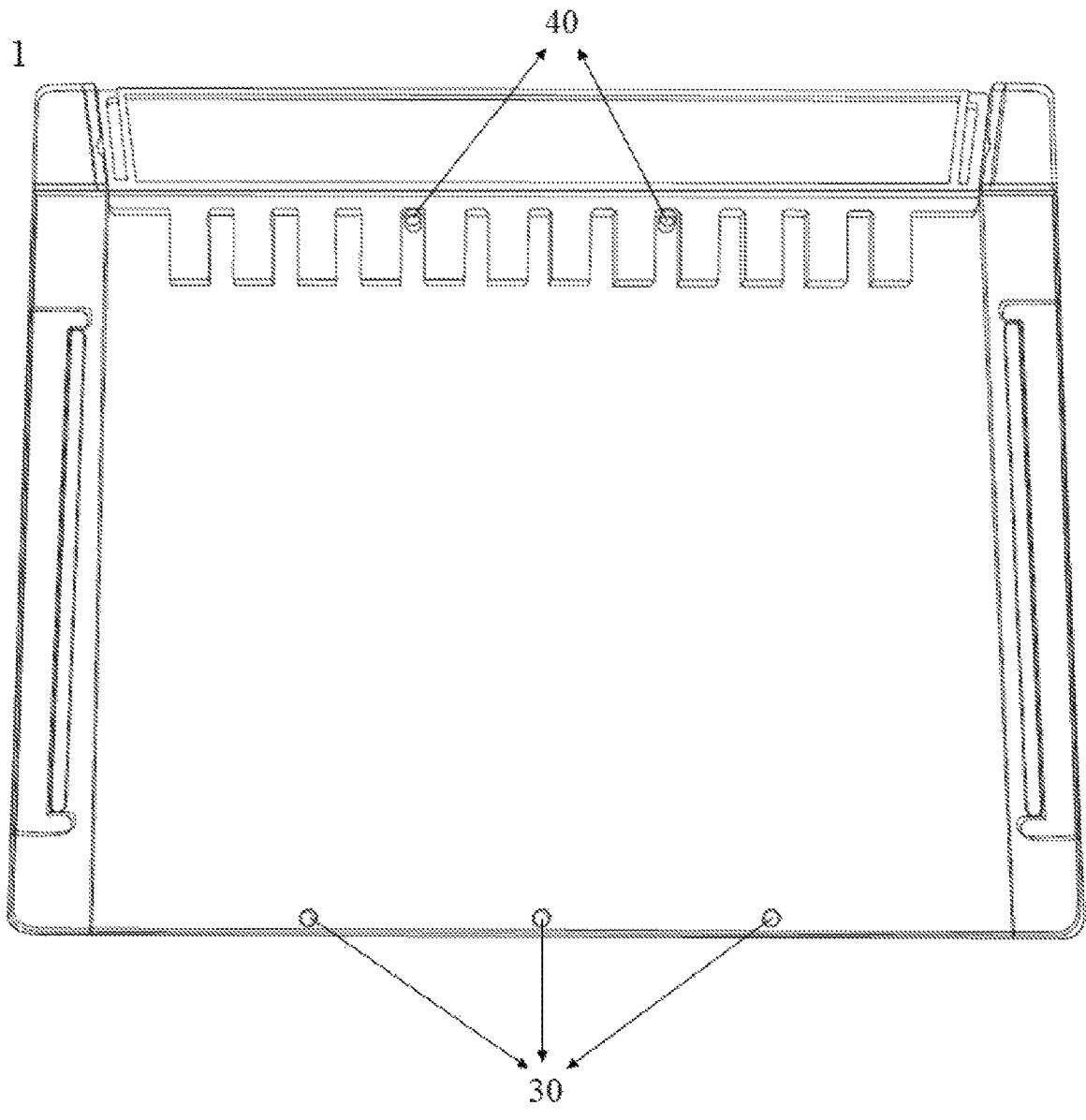
FIG. 7 shows the electrophoresis gel cassette comprises a
comb, at least one first protrusion disposed at an appropriate
position on a bottom portion of the first surface of the first
plate and at least one second protrusion disposed at an
appropriate position on a top portion of the first surface of
the first plate.

Combing with the embodiments shown in FIG. 3 and FIG. 5, the most preferred embodiment according to the invention is shown in FIG. 7. The electrophoresis gel cassette 1 might also comprise both the plurality of bottom protrusions 30 and the plurality of top protrusions 40 so as to provide a more stable electrophoresis gel accommodation space.

The electrophoresis gel deformation according to the invention means that the electrophoresis gel is swollen and distort by absorption of a buffer solution during storage, or the electrophoresis gel is atrophied by losing moisture during storage, or the electrophoresis gel is swollen and distort by the increasing working temperature or by absorption of a buffer solution during electrophoresis, or the electrophoresis gel is deformed by squeezing during the preparation process or transport.

While the invention has been described and exemplified in sufficient detail for those skilled in this art to make and use it, various alternatives, modifications, and improvements should be apparent without departing from the spirit and scope of the invention.

One skilled in the art readily appreciates that the present invention is well adapted to carry out the objects and obtain the ends and advantages mentioned, as well as those inherent therein. The embodiments are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

What is claimed is:

1. An electrophoresis gel cassette, consisting of:
a first plate;
a second plate;
a plurality of spacers; and
three protrusions,
wherein the first plate and the second plate respectively comprise a top side, a bottom side, a left side, a right side, a first surface and a second surface, and when the second plate is disposed substantially parallel to the first plate, the first surface of the first plate and the first surface of the second plate are parallel to each other, and the plurality of spacers is disposed on a left portion and a right portion of the first surface of the first plate or the second plate, in which a gel accommodating space is formed for accommodating an electrophoresis gel submerged in a buffer solution, and
in order to prevent the electrophoresis gel from being expanded or deformed due to absorption of the buffer solution when the electrophoresis gel cassette is being stored, the three protrusions are collinear and equidistantly spaced, and integrally formed with the first plate or the second plate and disposed at a position on a bottom of the first surface of the first plate or the second plate for connecting the first plate and the second plate.

2. The electrophoresis gel cassette of claim 1, wherein the plurality of spacers is integrally formed with the first plate or the second plate.

3. The electrophoresis gel cassette of claim 1, wherein the plurality of spacers and the three protrusions are bonded to the first plate or the second plate using an adhesive or ultrasonic oscillation.

* * * * *